United States Patent Office 2,765,215
Patented Oct. 2, 1956

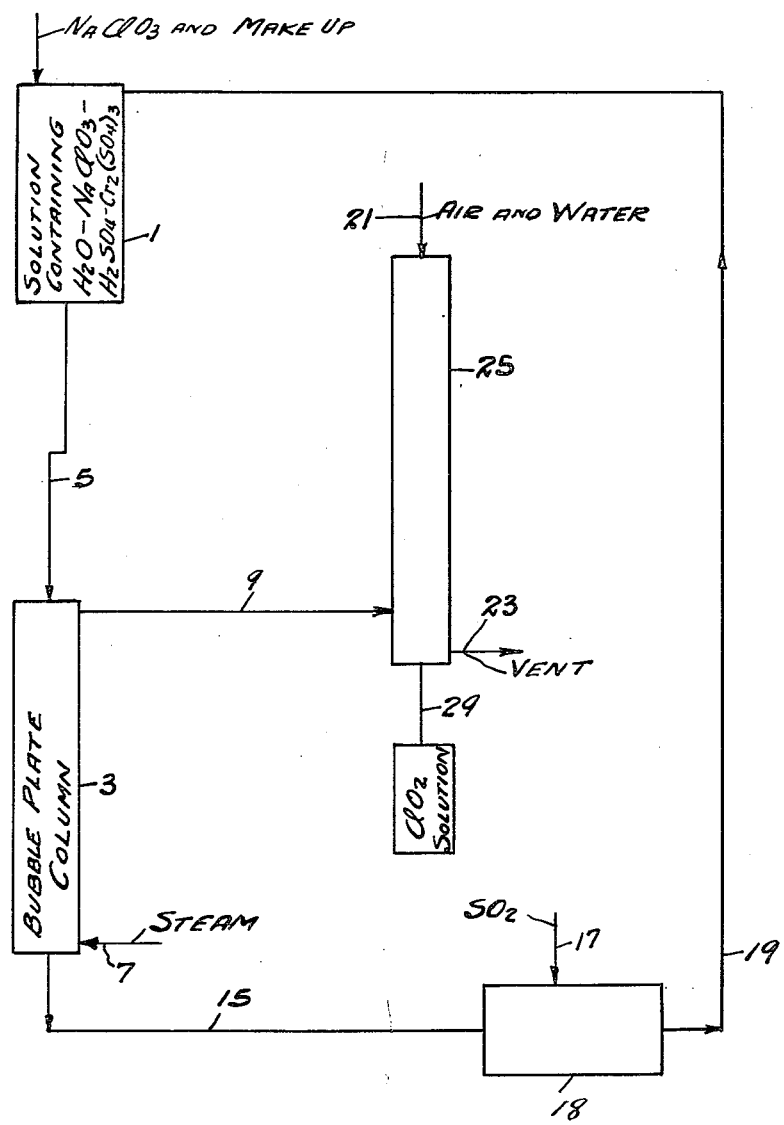

2,765,215

METHOD OF MAKING CHLORINE DIOXIDE

Alphonse Pechukas, Akron, and Gordon Andrew Carlson, Barberton, Ohio, assignors, by mesne assignments, to Columbia-Southern Chemical Corporation, Pittsburgh, Pa., a corporation of Delaware Application October 12, 1950, Serial No. 189,825

5 Claims. (Cl. 23—152)

This invention relates to a novel method of preparing chlorine dioxide. It is known that chlorine dioxide may be prepared by reaction of an aqueous solution containing trivalent chromium and alkali metal chlorate. In this case, the trivalent chromium serves to reduce the metal chlorate, thus evolving chlorine dioxide, and is itself oxidized to hexavalent chromium. A process of this character is described in U. S. Patent 2,376,935, granted May 29, 1945, to S. H. Persson.

In the normal practice of such process, a solution containing trivalent chromium is held at a temperature below 40° C. and sodium chlorate is added thereto, the amount of chlorate added being substantially in excess of 3 moles of chlorate per mole of trivalent chromium. Typical chlorate compounds which are used are the alkali metal chlorates, such as potassium or sodium chlorates. After this solution has been prepared, the solution is heated to an elevated temperature above 40° C., generally 80° to 100° C., and is contacted with an inert gas in order to strip evolved chlorine dioxide from the solution. Thereafter, the solution is cooled to a lower temperature, for example 10° to 30° C., upon which crystallization of sodium sulphate decahydrate occurs. These crystals are separated and the remaining solution is treated with a suitable reducing agent, such as sulphur dioxide, at a temperature below 40° C., in order to reduce hexavalent chromium in the solution to trivalent state, whereupon the solution is recycled.

This process is subject to several difficulties. In the first place, the sulphur dioxide reduction must be carefully controlled in order to prevent the temperature of the solution from rising above 40° C. This is necessary since at temperatures above 40° C. the sulphur dioxide will react with excess chlorate which remains in the solution, thus producing chlorine dioxide. This becomes quite hazardous, increasing the danger of explosions.

A further difficulty which arises in prior art processes has been that because of the large volume of solution required, the heating and cooling operations required are quite slow. Further, treatment of solutions in large volume increases the danger of localized overheating and this in turn increases the hazard of explosions due to chlorine dioxide.

In accordance with the present invention, a novel process has been provided which materially reduces the necessity for temperature control during the trivalent chromium reduction operation, which increases the rate of generation of chlorine dioxide, and also which permits bringing the reacting solution to reaction temperature in relatively small increments, thereby avoiding or minimizing danger of serious explosion.

According to this invention, trivalent chromium is reacted with chlorate in aqueous acid solution, under conditions such that the trivalent chromium is in excess of 1 mole per 3 moles of chlorate. This permits complete or substantially complete elimination of chlorate from the solution upon heating the solution to reacting temperature and stripping evolved chlorine dioxide from the solution. Consequently, the resulting solution containing hexavalent chromium may be subjected to reduction by sulphur dioxide or other reducing agent without the reduction of temperature to room temperature or below, which has been previously required.

According to a further embodiment of the invention, the process is effectively conducted by countercurrently contacting a stream of the trivalent chromium-chlorate solution in a gas-liquid contact column, such as a bubble-plate column or a packed column, with a hot inert gas or fluid. Steam is a particularly advantageous gaseous medium for this purpose. However, other condensable or non-condensable diluents, such as air, nitrogen, carbon dioxide, and the like may be used. It will be understood that the countercurrent contact of the reacting solution with the hot gaseous diluent results in a rapid heating of the solution as it passes through the column and simultaneous stripping of chlorine dioxide substantially as rapidly as formed from the solution.

Since the column is operated without flooding, it will be apparent that the volume of liquid in the column will be much less than the volume of gaseous diluent, and in fact the amount of liquid in the column at any one time will be quite small. Thus, the hazard of explosions which attend heating large volumes of a solution containing trivalent chromium and chlorate is substantially eliminated. Best results are obtained when the solution subjected to treatment is acid.

According to a further embodiment of the invention, it has been found that the rate of reaction is appreciably increased as acid concentration is increased. On the other hand, excessively high acid concentration sometimes complicates subsequent operations, i. e. crystallization of sodium sulphate. It has been found that best results are obtained when the acid is in concentration of at least two moles of acid per liter of solution; the optimum range being about two to four moles per liter. However, phosphoric acid, chromic acid, and like acids not oxidized by chlorine or chlorate are suitable.

The accompanying drawing conveniently illustrates a typical embodiment of the contemplated invention. As illustrated in this drawing, a suitable reacting solution may be prepared in a suitable vessel 1. This reacting solution may be prepared by mixing an alkali metal chlorate, such as sodium chlorate, with chromic sulphate in aqueous medium in proportions such that the trivalent chromium concentration is in excess of one mole per three moles of chlorate. The amount of such excess is capable of some variation. However, best results appear to be obtained when an excess of 20 to 120% of the theoretical required for stoichiometric reaction is used. Maximum effect is achieved when such excess ranges between 50 to 100% of theoretical.

In order to achieve rapid reaction, it is found advantageous to establish an acid content of at least two moles of sulphuric acid or equivalent acid per liter of solution. Solutions containing 2 to 5 moles of acid normally are used. It will also be understood that phosphoric acid or chromic acid or other like acid may be used, although sulphuric acid is preferred. Preparation of this solution is normally conducted at a temperature below about 40° C. and if necessary, suitable cooling equipment can be provided in order to maintain this temperature.

When the reaction mixture is thus prepared, very little actual reaction is observed to occur at a temperature below 40° C. In effect, the solution may be regarded as a solution of chromic chlorate. The reacting solution is delivered into the top of a suitable bubble-plate column or like gas-liquid contact column 3 through line 5.

Steam or a diluent gas is introduced into the bottom of the column through line 7 and passes upwardly in countercurrent contact with the falling reacting solution, heating the solution at the reacting temperature (above 40° C., usually 80 to 100° C.) and simultaneously stripping chlorine dioxide from the solution essentially as rapidly as produced. Preferably, the rate of flow of feed solution and steam is adjusted so as to decompose all of the chlorate before the solution leaves the bottom of the column. The mixture of steam and chlorine dioxide emanates from the packed column through line 9. Sufficient diluent, preferably steam, is used to produce a gaseous-chlorine dioxide mixture which will not explode and also to prevent dissolution of chlorine dioxide in the chlorate solution in the upper portion of the column. Hence, the gaseous mixture leaving the tower should contain at least 5, and preferably at least 9 volumes of diluent per volume of $ClO_2$.

The solution emanating from the bottom of the column passes through line 15 to a suitable receptacle 18 wherein the solution is regenerated for further use. This solution entering receptacle 18 comprises water, hexavalent chromium, and sulphuric acid. Sodium sulphate also may be present although, if desired, sodium sulphate may be separated from the mixture by crystallization or other method, prior to regeneration. This permits the regeneration to be conducted at higher temperatures than would be safe if chlorate were present.

In order to reduce the hexavalent chromium content of the solution introduced into receptacle 18, sulphur dioxide is introduced into line 17 and the solution is reduced thereby. This reduction may be conducted at any convenient temperature at which a rapid reduction will occur. Since chlorate is not present in the reaction, no particular care need be taken to maintain the temperature at a low level. Consequently, recourse to cooling, which is necessary where an excess of chlorate has been used, is eliminated.

Following reduction of the solution to chromic state, the solution is returned through line 19 to mixer 1 where sodium chlorate is added and the other reactants are made up to their initial concentration.

The gaseous mixture of steam and chlorine dioxide emanating through line 9 is delivered to a scrubber 25 which is cooled by suitable means to condense the steam. The water thus condensed dissolves the chlorine dioxide and conveys it to the bottom of the scrubber through line 29 to a chlorine dioxide solution storage tank 31. To avoid establishment of a vacuum due to condensation of steam and consequent establishment of localized explosive concentrations of gaseous chlorine dioxide, air is introduced into the upper portion of the scrubber through line 21. Water also may be directed downwardly through the scrubber, being introduced through line 21 to condense the steam and dissolve chlorine dioxide. Excess air emanates through line 23 to a suitable vent.

For most purposes it is found preferable to use superheated steam in the stripping operation in order to avoid excessive condensation. However, wet steam may be used so long as dilution of the solution does not become excessive.

When the steam is used to effect heating of the solution, more or less dilution is inevitable because of steam condensation. However, since sodium sulphate crystallizes as the decahydrate, water is removed from the solution during the crystallization when crystallization processes are resorted to. To avoid excessive dilution, condensation of steam should be limited so as not to exceed the amount of water which is removed as water of crystallization, upon crystallization of the sodium sulphate hydrates. This may be effected simply by using superheated steam where necessary.

One series of tests was conducted using an 11-section vacuum jacketed Bruun bubble-plate column into which the feed solution was fed for production of chlorine dioxide. A feed solution reservoir was connected to the column at the top and the outlet of the column at the top was vented to a condenser scrubber. This scrubber consisted of a 35 x 180 millimeter water-cooled vertical column packed with ¼ inch Berle saddles, and had a water-cooled cold finger mounted above the condenser column.

Substantially saturated steam was introduced into the bottom of the column and feed solution into the top thereof at the rates stated in the table below. The steam-chlorine dioxide mixture was condensed in the scrubber by passing countercurrently to a downwardly flowing stream of water. This water was introduced into the upper portion of the condenser and allowed to trickle downwardly over the packing, and the resulting chlorine dioxide solution was collected from the bottom of the condenser. The following table tabulates the conditions of several runs, and the results obtained:

| Run | Components of Feed Solution | | | | Solution Feed rate, milliliters per minute | Steam rate, liters per minute | $ClO_2$ in solution from condenser, grams per liter |
|---|---|---|---|---|---|---|---|
| | $Cr^{+3}$, moles per liter | $H_2SO_4$, moles per liter | $NaClO_3$, moles per liter | Percent of $Cr^{+3}$ Excess | | | |
| A | 1.4 | 2.0 | 2.1 | 100 | 2.0 | 3.6 | 19.4 |
| B | 0.98 | 4.0 | 2.1 | 40 | 1.3 | 8.2 | 16.9 |
| C | 1.05 | 4.0 | 2.1 | 50 | 2.5 | 9.4 | (*) |
| D | 1.40 | 4.0 | 2.1 | 100 | 1.0 | 3.7 | (**) |

*Rate of evolution of chlorine dioxide, 0.22 mole per hour.
**Rate of evolution of chlorine dioxide, 0.08 mole per hour.

It will be understood that the above process may be conducted by using other diluents. For example, in lieu of using steam, a previously heated gaseous diluent, such as nitrogen, air, carbon dioxide, and the like may be introduced into the bottom of the column. Such diluents offer certain disadvantages over the use of steam because they tend to cause excessive vaporization and consequent cooling of the solution and also tend to make more difficult the problem of recovering chlorine dioxide. Nevertheless, they may be used where recourse to steam has been found to be unsatisfactory. When used, the diluents should be sufficiently hot to heat the reacting solution to reaction temperature and thereby to cause evolution and stripping of $ClO_2$ from the reacting solution.

Although the present invention has been described as to specific details of certain embodiments thereof, it is not intended that such details shall be regarded as limitations upon the scope of the invention except insofar as included in the accompanying claims.

What is claimed:

1. The process of preparing chlorine dioxide which comprises forming an aqueous acid solution containing a water soluble trivalent chromium compound and a chlorate dissolved therein, the trivalent chromium therein being 20 to 120 percent in excess of 1 mole per 3 moles of chlorate, introducing said solution into the upper portion of a gas-liquid contact column, introducing a hot inert gaseous diluent into the bottom of a column at a rate sufficient to heat the solution to a temperature above 60° C. whereby to cause evolution of chlorine dioxide and to produce a mixture of chlorine dioxide and said diluent, in which the diluent concentration is sufficiently high to prevent explosion of the mixture, removing the mixture of the diluent and the chlorine dioxide from the upper portion of the column, removing the reacted solution from the lower portion of the column, contacting the solution emanating from the lower portion of the column with sulphur dioxide to reduce hexavalent chromium therein, adding further chlorate to the solution, and recycling to the upper portion of the column.

2. The process of preparing chlorine dioxide which comprises forming an aqueous acid solution containing a water soluble trivalent chromium compound and a chlorate dissolved therein, the trivalent chromium being 20 to 120 percent in excess of 1 mole per 3 moles of chlorate, introducing said solution into the upper portion of a gas-liquid contact column, introducing steam into the bottom of a column at a rate sufficient to heat the solution to a temperature above 60° C. and to produce a mixture containing at least 5 volumes of steam per volume of chlorine dioxide, removing the mixture of the diluent and the chlorine dioxide from the upper portion of the column, and removing the reacted solution from the lower portion of the column.

3. The process of preparing chlorine dioxide, which comprises heating above 40° C. an acid solution containing a water soluble trivalent chromium compound and a chlorate dissolved therein, the trivalent chromium being not less than 20 percent in excess of that required for stoichiometric reaction with the chlorate, continuing the heating until all the chlorate has been eliminated stripping evolved chlorine dioxide from the solution, regenerating the solution by introducing sulfur dioxide therein in order to reduce hexavalent chromium without substantially cooling the solution, adding further chlorate to the solution, and recycling the regenerated solution for further treatment for production of chlorine dioxide.

4. A method of preparing chlorine dioxide which comprises heating an aqueous acid solution containing a water soluble trivalent chromium compound and a chlorate dissolved therein to a temperature above 40° C. whereby to cause evolution of chlorine dioxide, the trivalent chromium being substantially in stoichiometric excess of the chlorate, continuing the heating until all the chlorate has been eliminated stripping evolved chlorine dioxide from the solution, regenerating the solution by introducing sulphur dioxide therein in order to reduce hexavalent chromium to trivalent chromium without substantially cooling the solution, adding further chlorate to the regenerated solution, and again heating the solution to recover chlorine dioxide.

5. A method of preparing chlorine dioxide which comprises heating an aqueous acid solution containing a water soluble trivalent chromium compound and a chlorate dissolved therein, the trivalent chromium being not less than 20 percent in excess of that required for stoichiometric reaction with the chlorate, said solution containing 2 to 4 moles per liter of sulphuric acid, stripping evolved chlorine dioxide from the solution, regenerating the solution by introducing sulphur dioxide therein in order to reduce hexavalent chromium to trivalent chromium without substantially cooling the solution, adding further chlorate to the regenerated solution, and again heating the solution to recover chlorine dioxide.

References Cited in the file of this patent
UNITED STATES PATENTS

| | | |
|---|---|---|
| 2,078,045 | Vincent | Apr. 20, 1937 |
| 2,338,268 | Stossel | Jan. 4, 1944 |
| 2,373,830 | Holst | Apr. 17, 1945 |
| 2,376,935 | Persson | May 29, 1945 |
| 2,451,826 | Haller | Oct. 19, 1948 |
| 2,481,240 | Rapson et al. | Sept. 6, 1949 |
| 2,510,034 | Haller | May 30, 1950 |